US012607702B2

(12) United States Patent
Gao et al.

(10) Patent No.: US 12,607,702 B2
(45) Date of Patent: *Apr. 21, 2026

(54) DEVICE-FREE SUBJECT LOCALIZATION METHODS AND SYSTEMS USING WIRELESS SIGNALS

(71) Applicant: AERIAL TECHNOLOGIES INC., Montréal (CA)

(72) Inventors: Yi Gao, Montréal (CA); Michel Allegue Martinez, Montréal (CA); Xi Chen, Montréal (CA); Xue Liu, Montréal (CA)

(73) Assignee: Aerial Technologies Inc., Montreal (CA)

( * ) Notice: Subject to any disclaimer, the term of this patent is extended or adjusted under 35 U.S.C. 154(b) by 168 days.

This patent is subject to a terminal disclaimer.

(21) Appl. No.: 18/410,440

(22) Filed: Jan. 11, 2024

(65) Prior Publication Data

US 2024/0142560 A1 May 2, 2024

Related U.S. Application Data

(63) Continuation of application No. 17/504,847, filed on Oct. 19, 2021, now Pat. No. 11,874,388, which is a
(Continued)

(51) Int. Cl.
*G01S 5/02* (2010.01)
*H04B 17/21* (2015.01)
(Continued)

(52) U.S. Cl.
CPC ............ *G01S 5/021* (2013.01); *G01S 5/0221* (2013.01); *H04B 17/21* (2015.01); *H04B 17/27* (2015.01); *H04W 64/00* (2013.01)

(58) Field of Classification Search
CPC ....... G01S 5/021; G01S 5/0221; H04B 17/21; H04B 17/27; H04W 64/00
See application file for complete search history.

(56) References Cited

U.S. PATENT DOCUMENTS 6,522,296 B2 2/2003 Holt
7,551,083 B2 6/2009 Modes et al.
(Continued)

FOREIGN PATENT DOCUMENTS

DE 102009033603 A1 1/2011
WO 2008024815 A2 2/2008
WO 2015114355 A1 8/2015

*Primary Examiner* — Timothy X Pham
(74) *Attorney, Agent, or Firm* — Rosenberg, Klein & Lee

(57) ABSTRACT

Within several applications the ability to localize an individual within an environment is beneficial. However, existing indoor localization approaches depend upon at least one of two assumptions. First, the subject(s) localization is achieved by localizing a wireless device carried by the subject and second, wireless fingerprints are established for the localization via a site survey being performed before a system can actually localize the subject(s). However, in many application scenarios, neither of the above two assumptions are true, namely that the user is not carrying an active wireless device or that the site has been surveyed. Accordingly, embodiments of the invention provide for subject localization by a dynamic calibration of wireless signals between a receiver and a transmitter, where neither the receiver or transmitter are associated with an electronic device carried or worn by the subject.

10 Claims, 9 Drawing Sheets

Related U.S. Application Data continuation of application No. 16/922,251, filed on Jul. 7, 2020, now Pat. No. 11,150,320, which is a continuation of application No. 15/493,616, filed on Apr. 21, 2017, now Pat. No. 10,705,179.

(60) Provisional application No. 62/326,231, filed on Apr. 22, 2016.

(51) Int. Cl.
*H04B 17/27* (2015.01)
*H04W 64/00* (2009.01)

(56) References Cited

U.S. PATENT DOCUMENTS

| | | | |
|---|---|---|---|
| 8,615,254 | B2 | 12/2013 | Jamtgaard et al. |
| 2003/0052821 | A1 | 3/2003 | Holt |
| 2006/0092016 | A1 | 5/2006 | Modes et al. |
| 2008/0191941 | A1 | 8/2008 | Saban et al. |
| 2008/0204322 | A1 | 8/2008 | Oswald et al. |
| 2010/0231449 | A1 | 9/2010 | Jacobs |
| 2012/0122484 | A1 | 5/2012 | Marchenko et al. |
| 2014/0285660 | A1 | 9/2014 | Jamtgaard et al. |
| 2016/0345286 | A1 | 11/2016 | Jamieson et al. |
| 2017/0212210 | A1 | 7/2017 | Chen et al. |
| 2017/0223498 | A1 | 8/2017 | Banavar et al. |

DEVICE-FREE SUBJECT LOCALIZATION METHODS AND SYSTEMS USING WIRELESS SIGNALS

CROSS-REFERENCE TO RELATED APPLICATIONS

This patent application claims the benefit as a continuation of U.S. patent Ser. No. 17/504,847 filed Oct. 19, 2021; which itself claims the benefit of priority as a continuation of U.S. patent application Ser. No. 16/922,251 filed Jul. 7, 2020 which has issued as U.S. Pat. No. 11,150,320; which itself claims the benefit of priority as a continuation of U.S. patent application Ser. No. 15/493,616 filed Apr. 21, 2017 which has issued as U.S. Pat. No. 10,705,179; which itself claims the benefit of priority from U.S. Provisional Patent Application 62/326,231 filed on Apr. 22, 2016.

FIELD OF THE INVENTION

This invention relates to subject localization and more particularly to wireless based subject localization without fingerprinting and device free with respect to the subjects.

BACKGROUND OF THE INVENTION

Many currently used wireless communication systems such as LTE, LTE-Advance, IEEE 802.11n and IEEE 802.11ac continuously sense the state of the wireless channel through well-known signals, or pilot signals, in order to dynamically optimize the transmission rate or improve the robustness of the system. These channel sensing mechanisms are continuously improving and enable self-driven calibration systems and wireless signal pre-compensation and post-compensation techniques, significantly improving the quality of wireless communication.

Measurable variables of wireless channels have also been used for the purpose of localization. One of the most commonly used types of information for this purpose is the wireless signal strength. For example, a positioning method for mobile devices has been developed exploiting received signal strength (RSS) data which is collected from multiple reference devices. Based on a path loss function, the RSS data are then used to estimate the distances between the target and the reference devices.

Another positioning method for mobile devices within the prior art exploits the construction of a mapping between the RSS data and the device location, and stores this mapping as fingerprints. The method then compares the new RSS data with the fingerprints to estimate the location of the target device. Alternatively, a field testing tool referred to as "OmniTester" has been developed which integrates received signal-strength and error-rate testing for wireless networks.

More fine-grained information is available in modern communication systems and several approaches have been proposed in order to improve these systems. For example, a method that provides periodic channel state information (CSI) data has been developed. However, these fine-grained measurements are not only valuable for controlling and optimizing communication networks and links as they can also be used for the purpose of localization of subject.

Existing indoor localization approaches based on wireless channel information (e.g., RSS, CSI) depend on at least one of the following two assumptions. First, the subject(s) localization is achieved by localizing a wireless device (e.g., RFID, phone) carried by the subject(s), i.e., device-based localization. Second, fingerprints are established for the localization, i.e., the localization system needs a site survey to be performed before it can actually localize the subject(s).

However, in many application scenarios, neither of the above two assumptions are true, namely that the user is not carrying an active wireless device or that the site has been surveyed. When either or both of these scenarios then there are no techniques within the prior art that provide for the localization of subject(s) within an indoor environment.

Accordingly, it would be beneficial to provide an indoor localization system which is device-free and requires no fingerprinting before system deployment.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to subject localization and more particularly to wireless based subject localization without fingerprinting and device free with respect to the subjects.

In accordance with an embodiment of the invention there is provided a method for localizing a subject comprising dynamically calibrating one or more received wireless signals at a receiver operating according to a predetermined standard transmitted by a transmitter operating according to the predetermined standard and performing a localization process relating to a subject, wherein the localization process comprises subsequently processing the calibrated one or more wireless signals.

In accordance with an embodiment of the invention there is provided a device comprising a microprocessor and a non-transitory computer-readable storage medium storing a set of instructions which, when executed by at least one processor, cause the at least one processor to perform steps comprising dynamically calibrating one or more received wireless signals at a receiver operating according to a predetermined standard transmitted by a transmitter operating according to the predetermined standard and performing a localization process relating to a subject, wherein the localization process comprises subsequently processing the calibrated one or more wireless signals.

In accordance with an embodiment of the invention there is provided a non-transitory computer-readable storage medium storing a set of instructions which, when executed by at least one processor, cause the at least one processor to perform steps comprising dynamically calibrating one or more received wireless signals at a receiver operating according to a predetermined standard transmitted by a transmitter operating according to the predetermined standard and performing a localization process relating to a subject, wherein the localization process comprises subsequently processing the calibrated one or more wireless signals.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
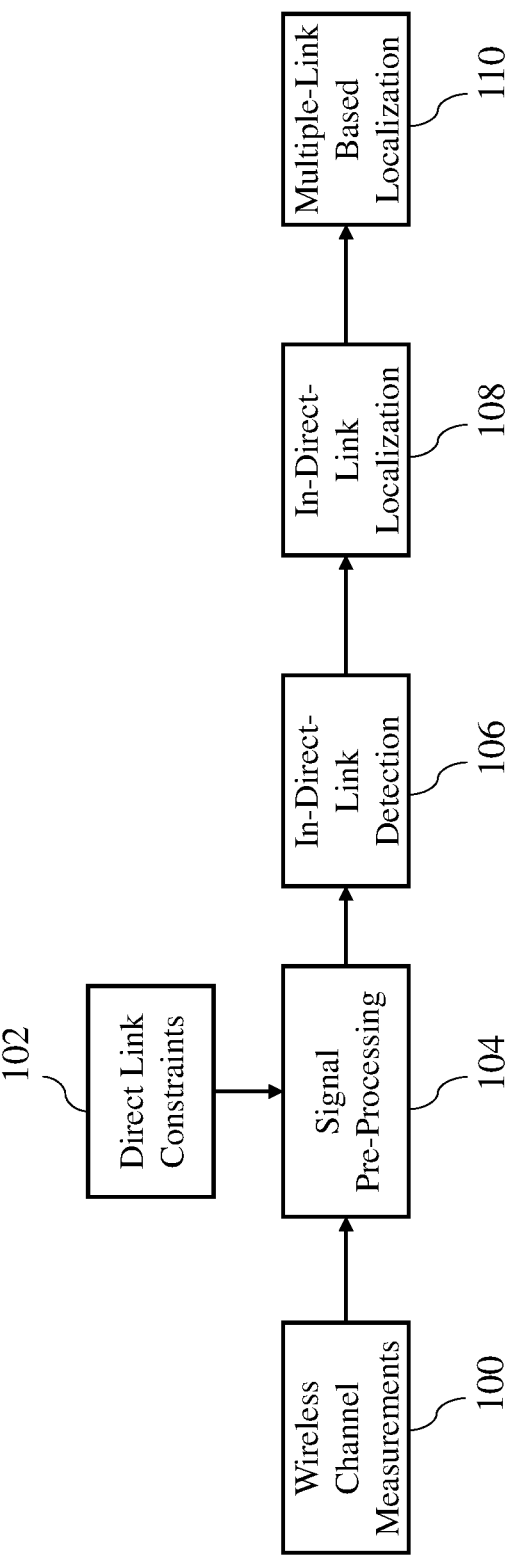
FIG. 1 depicts a block diagram of a model according to an embodiment of the invention for localization of subject(s) in a device-free manner without requiring previous measurements.

The present invention is directed to subject localization and more particularly to wireless based subject localization without fingerprinting and device free with respect to the subjects.

The ensuing description provides representative embodiment(s) only, and is not intended to limit the scope, applicability or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purposes only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users. Reference to terms "including", "comprising", "consisting" and grammatical variants thereof do not preclude the addition of one or more components, features, steps, integers or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, a wearable device and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

A "server" as used herein, and throughout this disclosure, refers to one or more physical computers co-located and/or geographically distributed running one or more services as a host to users of other computers, PEDs, FEDs, etc. to serve the client needs of these other users. This includes, but is not limited to, a database server, file server, mail server, print server, web server, gaming server, or virtual environment server.

An "application" (commonly referred to as an "app") as used herein may refer to, but is not limited to, a "software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

A "subject" as used herein may refer to, but is not limited to, an individual or group of individuals. This includes, but is not limited to, private individuals, employees of organizations and/or enterprises, members of community organizations, members of charity organizations, men, women, and children. In its broadest sense the user may further include, but not be limited to, animals, software systems, mechanical systems, robotic systems, android systems, physical objects, physical elements, etc. that may be characterised (i.e. located) by one or more embodiments of the invention.

A "transmitter" (a common abbreviation for a radio transmitter or wireless transmitter) as used herein may refer to, but is not limited to, an electronic device which, with the aid of an antenna, produces radio waves. The transmitter itself generates a radio frequency alternating current containing the information to be transmitted which is applied to the antenna which radiates radio waves. A transmitter may be discrete or it may form part of a transceiver in combination with a receiver. Transmitters may be employed within a variety of electronic devices that communicate by wireless signals including, but not limited to, PEDs, FEDs, two-way radios, and wireless beacons. A transmitter may operate according to one or more wireless protocols in dependence upon its design.

A "receiver" (a common abbreviation for a radio receiver or wireless receiver) as used herein may refer to, but is not limited to, an electronic device that receives radio waves via an antenna which converts them to a radio frequency alternating current wherein the receiver processes these signals to extract the transmitted information. Receivers may be employed within a variety of electronic devices that communicate by wireless signals including, but not limited to, PEDs, FEDs, two-way radios, and wireless beacons. A receiver may operate according to one or more wireless protocols in dependence upon its design.

A "wireless protocol" as used herein may refer to, but is not limited to, a specification defining the characteristics of a wireless network comprising transmitters and receivers such that the receivers can receive and convert the information transmitted by the transmitters. Such specifications may therefore define parameters relating to the wireless network, transmitters, and receivers including, but not limited to, frequency range, channel allocations, transmit power ranges, modulation format, error coding, etc. Such wireless protocols may include those agreed as national and/or international standards within those regions of the wireless spectrum that are licensed/regulated as well as those that are unlicensed such as the Industrial, Scientific, and Medical (ISM) radio bands and hence are met by equipment designed by a single original equipment manufacturer (OEM) or an OEM consortium. Such wireless protocols may include, but are not limited to, IEEE 802.11 Wireless LAN, IEEE 802.16 WiMAX, GSM (Global System for Mobile Communications, IEEE 802.15 Wireless PAN, UMTS (Universal Mobile Telecommunication System), EV-DO (Evolution-Data Optimized), CDMA 2000, GPRS (General Packet Radio Service), EDGE (Enhanced Data Rates for GSM Evolution), Open Air, HomeRF, HiperLAN1/HiperLAN2, Bluetooth, ZigBee, Wireless USB, 6IoWPAN, and UWB (ultra-wideband).

The following relates to the localization of moving and/or static subjects by using information available in the lower layers of the Open Systems Interconnection (OSI) protocols (commonly referred to as the OSI reference model) of a wireless communication system, either according to an existing specification, a planned specification, or a future specification.

The following propose a new device-free method for localization of subject(s) that does not require the use of conventional fingerprinting techniques. The method proposed herein is based on measurements of the wireless channel within a wireless network characterized by wireless transmitter(s), wireless receiver(s), and/or wireless transceivers. The wireless network whose measurements are employed within embodiments of the invention may be one concurrently in use for another application, e.g. data and/or voice communications, or it may be a wireless network installed solely for the purposes of subject localization. Such wireless transmitter(s), wireless receiver(s), and/or wireless transceivers may within embodiments of the invention be associated with PEDs and/or FEDs as well as dedicated wireless network infrastructure.

The methodology described below with respect to the localization of moving and/or static subjects by using information available in the lower layers of the OSI reference model of a wireless communication system may be implemented locally and/or remotely dependent upon one or more factors including, but not limited to, the configuration of the wireless network, the wireless network elements deployed, the local processor loading, network connectivity to remote resources (e.g. servers) etc. Accordingly, embodiments of the invention may be implemented locally upon wireless network elements/infrastructure as a dedicated discrete application or an application forming part of the overall operating system or implemented remotely upon servers associated. Such servers may, for example, be associated with the enterprise wishing to localize subjects within its physical infrastructure etc. or with a provider of the wireless network or a third party service provider.

It has been recognized that wireless signals in an environment can be analyzed to determine effects on the signals as they propagate through the environment. In this way, characteristics of the environment (i.e., the wireless channel) can be determined. These characteristics can be taken from the sensing mechanisms implemented in current wireless communication systems, for example, when using signals which are well-known by both the transmitter and the receiver. Analyzing these signals provides valuable information to the system regarding the current wireless channel state. For example, the frequency response of a wireless channel is important for the channel equalization in OFDM-based systems.

These channel characteristics are not only useful for improving the wireless transmission efficiency, but also able to provide information about the surrounding environment. In OFDM systems, a number of orthogonal subcarriers are used to transmit data. For each subcarrier, a complex number representing the frequency response of the channel for that particular subcarrier is estimated by the wireless system. The channel frequency response could be estimated by analyzing the changes experienced by a group of subcarriers distributed over the channel. In wireless communication systems such as Wi-Fi, the channel frequency response of each of the different spatial streams is reported as channel state information (CSI). The transmitter and the receiver can both include multiple antennas. A pair of one transmitter antenna and one receiver antenna is usually referred to as a spatial stream, or simply, a stream. Wireless channel measurements can be obtained for each stream.

Within the ensuing descriptions of embodiments of the invention the inventors describe them with respect to the term CSI. However, such references should not be interpreted with respect to the scope, techniques, options, and implementations of the inventive methods and systems described herein. Similarly, whilst embodiments of the invention are described and depicted with respect to Wi-Fi systems such references should not be interpreted with respect to the scope, techniques, options, and implementations of the inventive methods and systems described herein as these may be applied to other wireless networks both those according to national and/or international telecommunications standards and those developed and deployed without compliance to any such telecommunications standards.

Wireless channel measurements establish information in respect of the surrounding environment. In particular, the inventors have established that the locations of nearby subjects can be inferred from these measurements since subjects and objects reflect, scatter and attenuate wireless signals even when they are not carrying an active wireless device operating on the wireless network the measurements are made upon.

The inventors describe a novel approach for the localization of subject(s) based on wireless channel measurements (e.g., CSI), in a device-free and no-fingerprint manner. Within this context the term "device-free" refers to performing localization wherein the subject(s) being localized are not directly associated with any devices within the wireless network environment within which the subject(s) are. Accordingly, a subject is not carrying an active wireless device operating on the wireless network the measurements are made upon. This does not mean the subject(s) are not carrying any wireless device but rather any wireless device they are using is operating in a manner that does not itself interfere with the wireless measurements and/or act as transmitter within the wireless network performing the measurements. Within this context the term "no-fingerprint" means that the localization does not require any real location information which is employed as training data.

FIG. 1 depicts a block diagram of a model according to an embodiment of the invention for localization of subject(s) in a device-free manner without requiring previous measurements. Accordingly, as depicted in FIG. 1 wireless channel measurements 100 (e.g., CSI) are obtained for further processing. The direct link constraints 102 are physical constraints about the direct link which is the straight-line link from the transmitter to the receiver. Using the wireless channel measurements 100 and the direct link constraints 102 as inputs, the signal pre-processing component 104 pre-process the wireless channel measurements. After the signal pre-processing 104, the in-direct-link detection 106 determines whether there are any subjects in the direct link Next, if the in-direct-link detection 106 detects the existence of subjects in the direct link, the in-direct-link localization 108 estimates the location of the subjects in the direct link relative to the transmitter and the receiver. Finally, the in-direct-link localization results of multiple direct links can be used to perform more accurate localization.

In the current OFDM-based Wi-Fi systems, the bandwidth is 20 MHz or 40 MHz, which is not sufficient to decompose different multipath of wireless channels. Concretely, the bandwidth is directly related to the resolution of decomposing the multipath. For example, when the bandwidth is 20 MHz, the minimum time difference of two distinguishable paths is 50 ns, which translates to 15 meters since the wireless signal travels at the speed of the light. When wider bandwidth is available, the minimum difference of path length distinguishable multipath is smaller, e.g., 1.875 m when the bandwidth is 160 MHz (IEEE 802.11ac), and then the more multipath can be distinguished accurately. In this case, the in-direct-link localization technique can be extended to every multipath.

Figure 2:
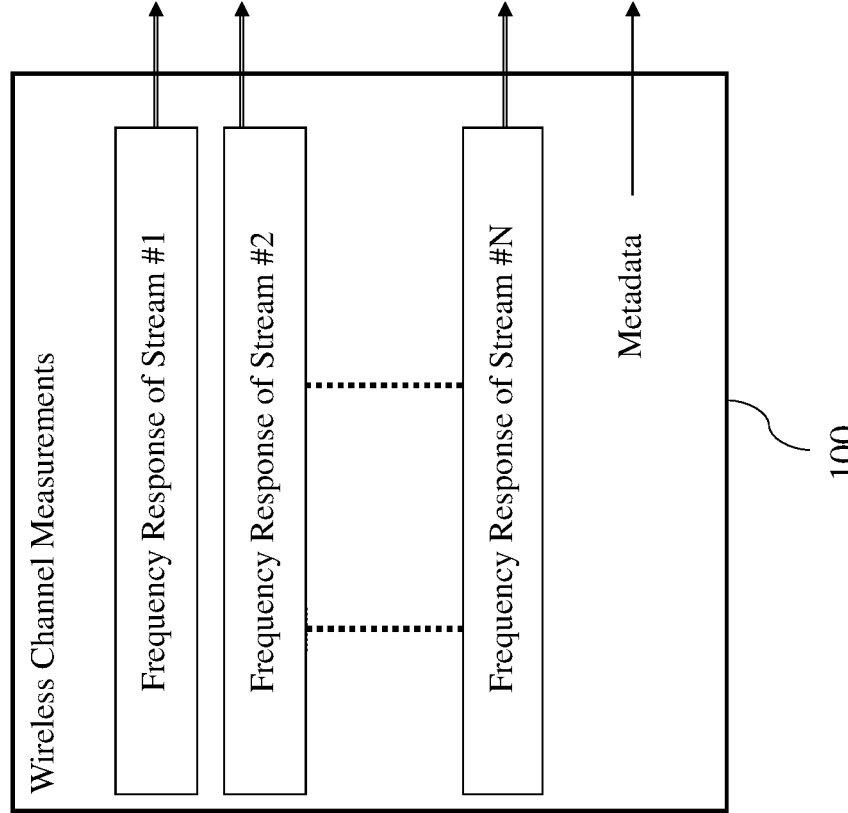
FIG. 2 illustrates an example of measurements that can be collected from the wireless channel, e.g., the frequency response per available spatial stream and the metadata, and exploited within embodiments of the invention.

The wireless channel measurements 100 shown in FIG. 1 include the wireless channel measurements of one or multiple streams. As illustrated in FIG. 2, the wireless channel measurements of N streams as well as the metadata are obtained for further processing. Examples of the metadata include the number of streams, noise level, etc. In practice, there may be multiple receivers and/or multiple transmitters, each with multiple antennas. For example, when there are two 3-antenna transmitters and one 2-antenna receiver, there are $2 \times 3 \times 2 = 12$ streams in total.

Figure 3:
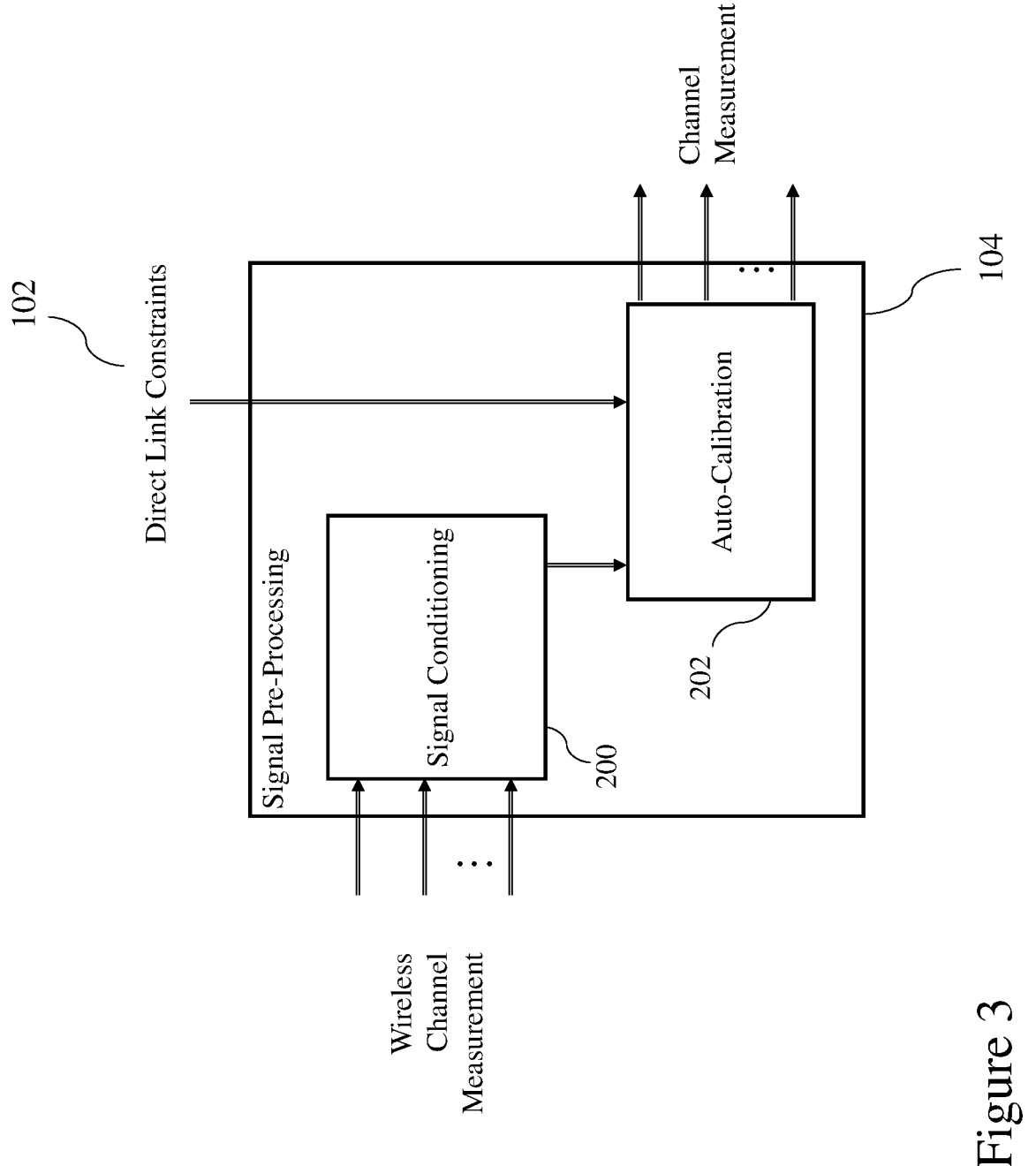
FIG. 3 illustrates a signal pre-processing component of a system according to an embodiment of the invention which is composed of a signal conditioning block and an auto-calibration block.

As illustrated in FIG. 3, the signal pre-processing component 104 includes two steps, a signal conditioning process 200 and the auto-calibration 202. The signal conditioning 200 takes the wireless channel measurements as input and pre-processes the data providing appropriate signals for feeding the following processes. Before the wireless channel measurements can be provided as input to the rest of the method proposed herein, antenna permutations, filtering techniques, and/or normalization of the measurements need to be applied. The auto-calibration 202 is a key component in the signal pre-processing component 104. It takes two kinds of inputs, the wireless channel measurements after the signal conditioning process 200 and the direct-link constraints 102. The output of the auto-calibration component 202 is the calibrated wireless channel measurements which can be further used for localization purposes.

Figure 4:
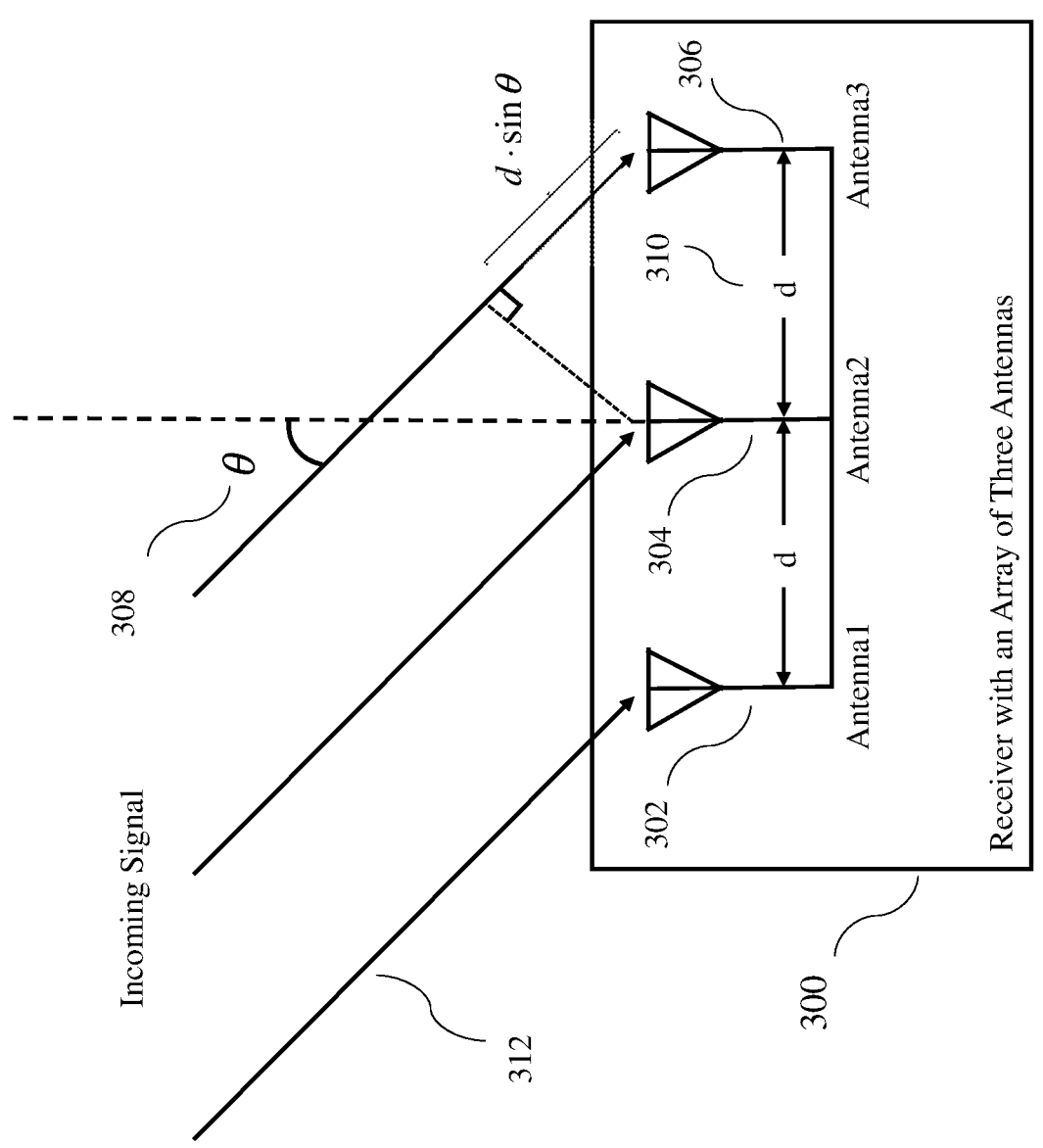
FIG. 4 illustrates a receiver with an array of three antennas and the concept of angle of arrival (AoA)

FIG. 4 shows an example of a three-antenna receiver 300 and the incoming signal direction. In this example, three antennas 302, 304 and 306 form a linear antenna array with a spacing d 310. When the transmitter is far away from the receiver, meaning the antenna spacing d is at least 20 times smaller than the distance between the transmitter and the receiver, the incoming signal can be viewed as parallel signals. The angle of arrival (AoA) 308 is θ in this example. Due to the AoA, the incoming signal 312 arrives to the different antennas at different times. In this example, the distance between two adjacent antennas is d 310 and, the incoming signal arrives at antenna 3 306 at a time (d·sin θ)/c later than it arrives at antenna 2 304, where c is the speed of light. Similarly, the incoming signal arrives at antenna 2 304 at a time (d·sin θ)/c later than it arrives at antenna 1 302. The time difference when the signal arrives different antennas can be estimated by the frequency response's phase difference measured at these antennas: antenna 1 302, antenna 2 304, and antenna 3 306. Then based on the time difference, the AoA can be estimated.

Figures 5A, 5B, 5C, 5D:
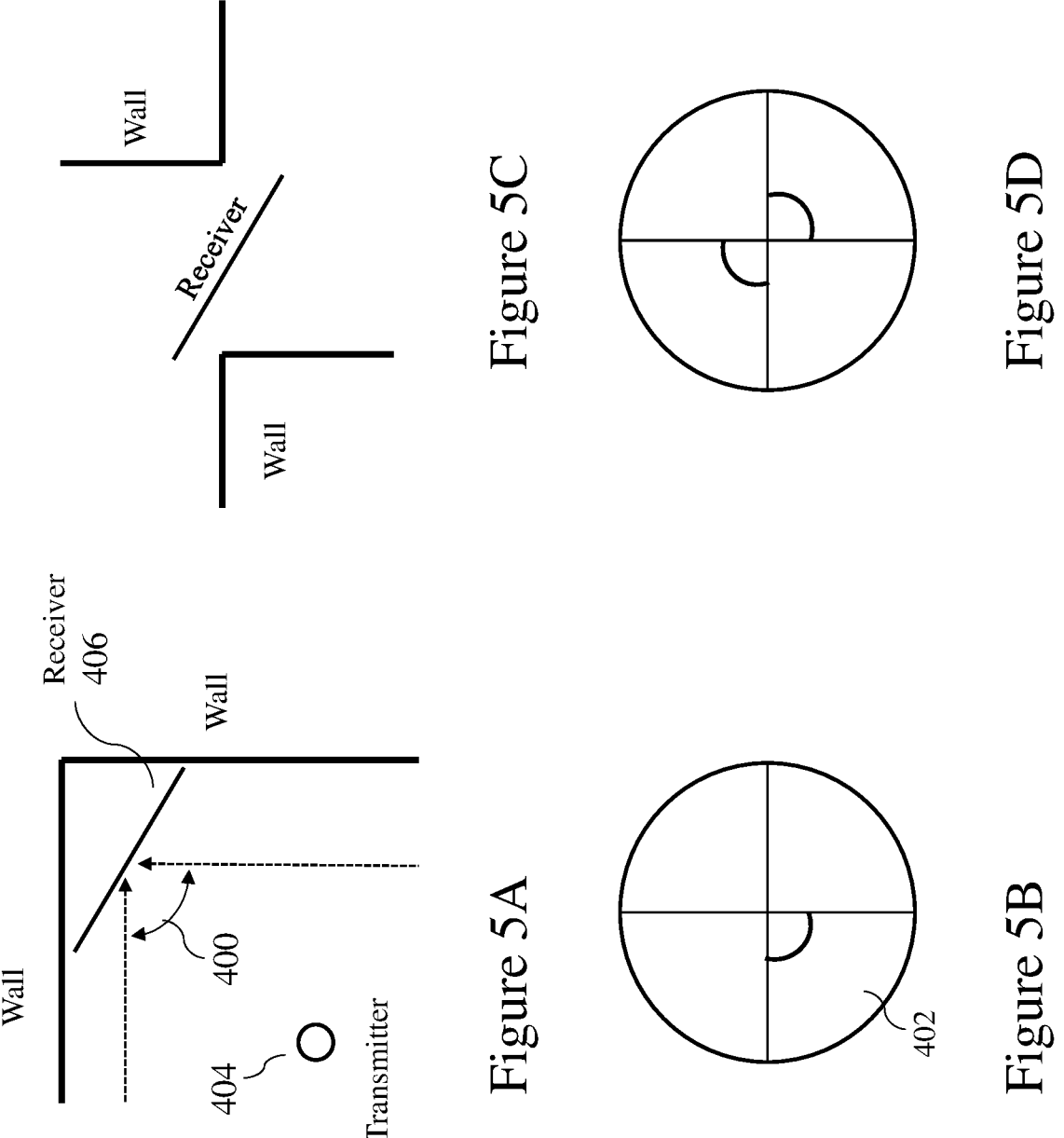
FIGS. 5A to 5D depict examples of direct link constraints impacting systems according to embodiments of the invention.

The direct link constraints 102 are physical constraints about the direct link from the transmitter 404 to the receiver 406 shown in FIG. 5A. In particular, the constraints are the AoA constraints. For example, a receiver is shown in FIG. 5A. Due to the two walls, the possible AoAs of the incoming signal are constrained in a range 400. The range is also shown in FIG. 5B. This range of AoAs is the direct link constraints 102, which are further used for auto-calibration 202. FIG. 5C shows another example. In this example, the direct link constraints are illustrated in FIG. 5D.

Given the wireless channel measurements and the direct link constraints 104, the auto-calibration component 104 is able to calibrate the system automatically. Concretely, the auto-calibration 104 estimates a constant phase offset $\beta_i$ for each antenna i of a receiver. Details of the auto-calibration 104 are described as follows.

When the receiver receives a packet, it obtains a wireless channel measurement per subcarrier per antenna. We use $H(f_k,i)$, a complex number, to denote the frequency response reported by antenna i at a subcarrier with central frequency $f_k$. $\angle H$ is the phase of this frequency response. The phase information is essential for the AoA estimation. However, existing OFDM hardware may report the phase information with an offset which is constant every time the device is powered up. The phase offsets of different antennas are different, introducing difficulties for further analysis.

The basic idea is to use the direct link constraints to perform auto-calibration, i.e., calculate these phase offsets. For example, when the receiver has three antennas, there are three unknown phase offsets, $\beta_1$, $\beta_2$, $\beta_3$. In an indoor environment, there could be multiple transmitters moving around in the same room as the receiver to form many direct links. For example, in FIG. 5A, the possible AoA of the direct link is in a range of (-60°,30°). Then we can compare the measured phase data to the direct link constraints 102 and estimate the unknown phase offsets.

Figure 6:
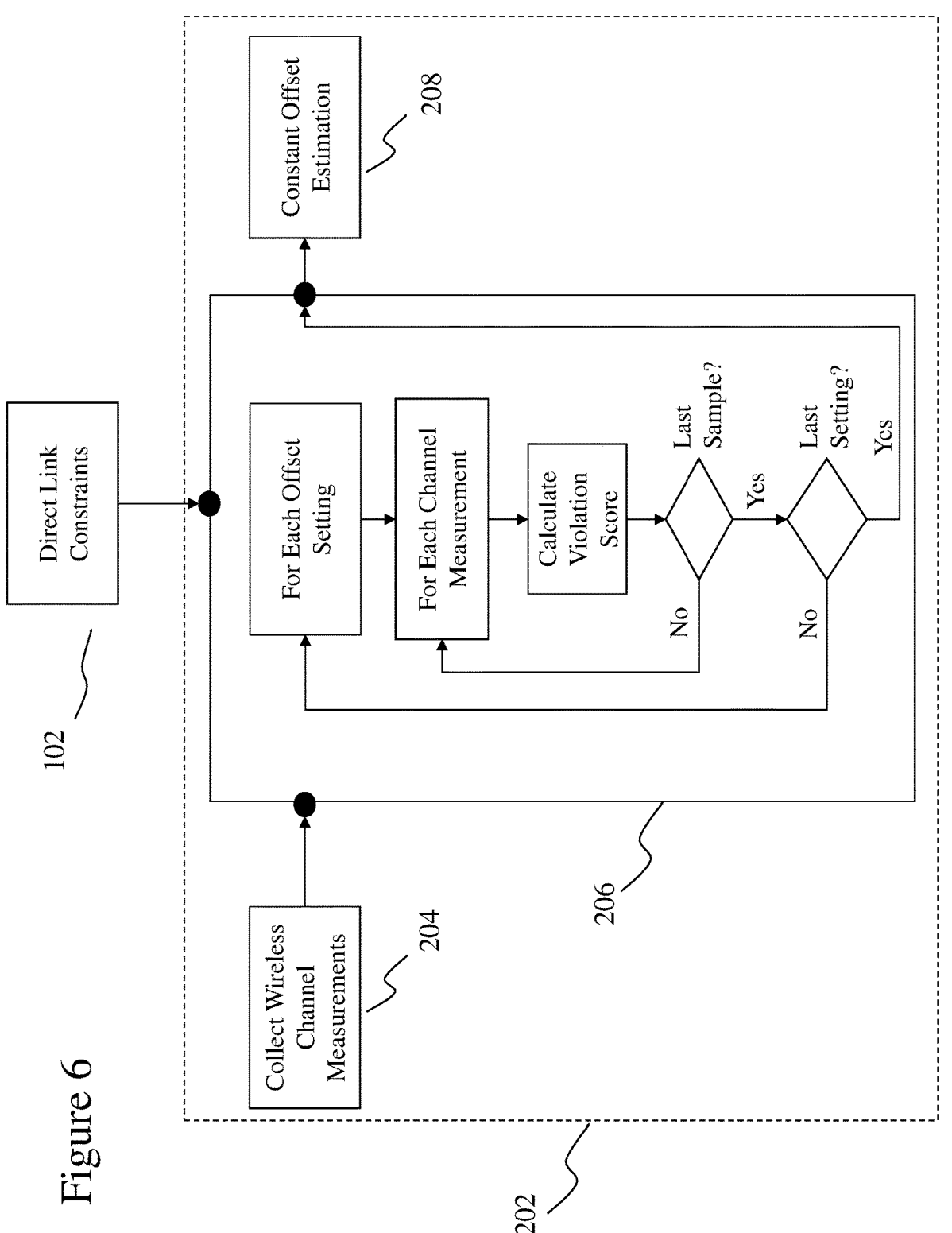
FIG. 6 depicts a block diagram of an auto-calibration module of a system according to an embodiment of the invention which takes the channel measurements and direct-link constraints as input and output the estimated constant offsets.

FIG. 6 shows the auto-calibration 202 process in detail. The key 206 is to calculate a violation score for each offset setting for each wireless channel measurement. Concretely, an offset setting is a vector of offsets with each element representing the phase offset of an antenna. For example, an offset setting with three antennas could be (+0.0,+0.1,-0.4). Due to the constant offsets of multiple antennas of the receiver, the estimated AoA could be out of the possible range given by the direct link constraints. Therefore, the violation score captures the probability of the offset setting. Finally, the offset setting with the smallest violation score is the estimation result.

The next step is in-direct-link detection 106 which determine whether there is a subject in the direct link or not. It can be done based on the magnitude variance of the frequency response. Concretely, given a sequence of wireless channel measurements, we can calculate the magnitude of each measurement for each subcarrier. Then we can calculate the variance for each subcarrier and the average variance. Then we can use a threshold based approach to detect whether there is a subject(s) in the direct link.

Figure 7:
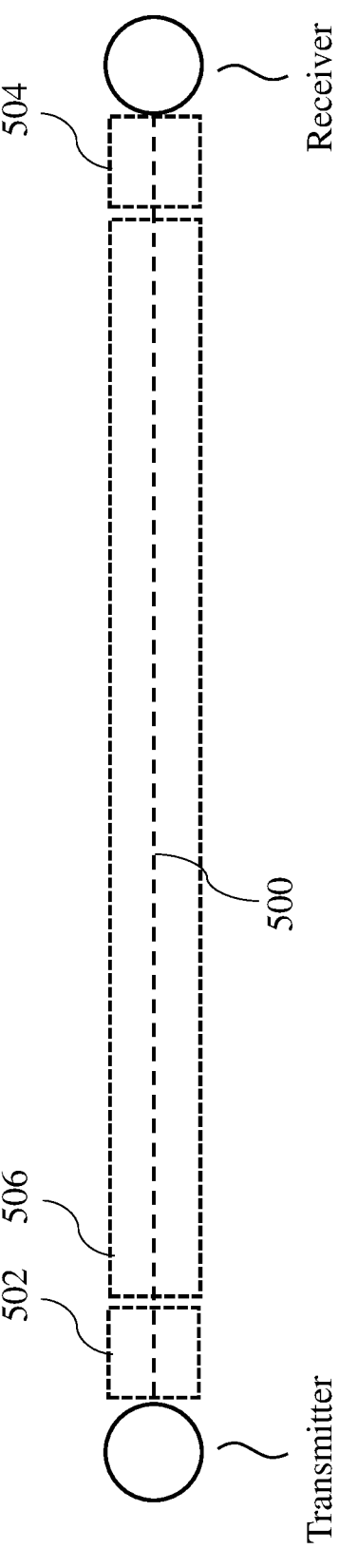
FIG. 7 depicts an example of in-direct-link localization with one transmitter and one receiver by implementing a method and system according to an embodiment of the invention.

When the system detects that there is a subject in the direct link, it can start in-direct-link localization 108. As shown in FIG. 7, the output of the in-direct-link localization is to estimate the relative location of the detected subject in the direct link 500.

Since we are not using any fingerprinting, the in-direct-link localization should be conducted in a deterministic manner. A possible solution of in-direct-link localization is given as follows.

We first determine whether the subject is very close to the transmitter or receiver, i.e., in location 502 or location 504 shown in FIG. 7. When the subject is in one of these two locations, most of the paths of the wireless channel are affected. Therefore, the subject will cause significant dynamics of the wireless channel, which can be inferred by analyzing the wireless channel measurements.

In order to distinguish location 502 and location 504, we further use the AoA spectrum of wireless channel measurements. As shown in FIG. 4, the AoA of the signal can cause different arrival times at different antennas. By exploiting this time difference, there exist algorithms within the prior art which can estimate the AoA. For example, the Multiple Signal Classification (MUSIC) algorithm is a widely studied algorithm which can be used to estimate AoA. However, other algorithms and methodologies may be applied.

Figures 8A, 8B:
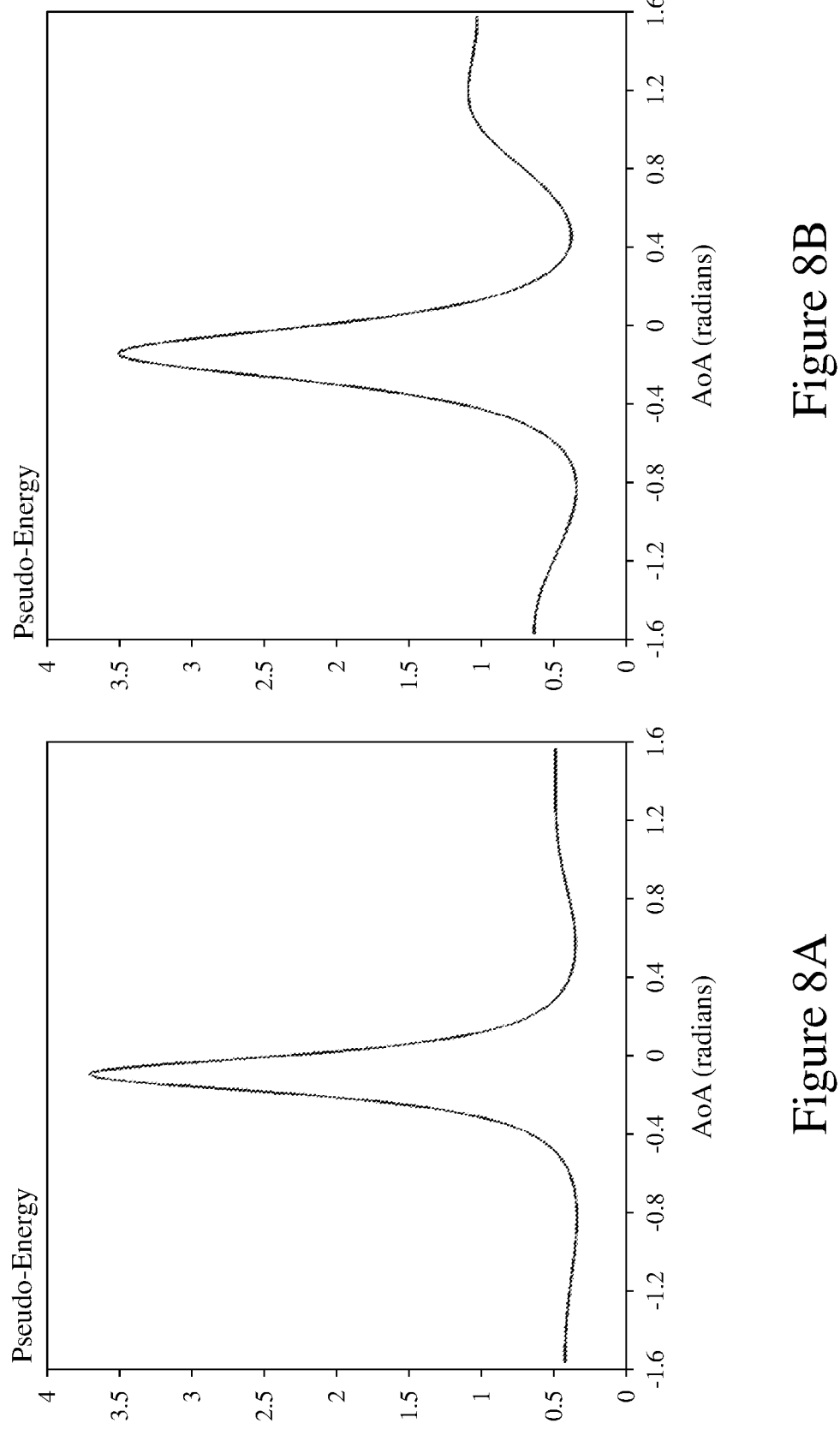
FIGS. 8A and 8B depict examples of AoA spectra.

The MUSIC algorithm calculates an AoA spectrum and finds the peaks as the estimated AoAs. FIGS. 8A and 8B depict two examples of AoA spectrums wherein in each instance the X-axis is AoA, and the Y-axis is the pseudo-energy. When there is one significant path, the AoA spectrum will give one peak, e.g., FIG. 8A Similarly, FIG. 8B shows the case when there are two significant paths. The inventors exploit this AoA spectrum to distinguish location 502 and location 504. When the subject is in location 504, more multipath signals may be affected compared with the case when the subject is in location 502. Therefore, when the subject is in location 504, the AoA spectrum will be similar to the empty case, since many multipaths are also affected in addition to the direct path. In contrast, when the subject is in location 502, only a small number of multipath signals and the direct path are affected, causing the AoA spectrum to be flatter than the empty case. Therefore, by analyzing the AoA spectrum, we are able to distinguish location 502 and location 504.

The next step is to determine the location of the subject in location 506. In this case, we can still use the similar AoA spectrum based approach. However, the localization accuracy could be lower.

Figures 9, 10:
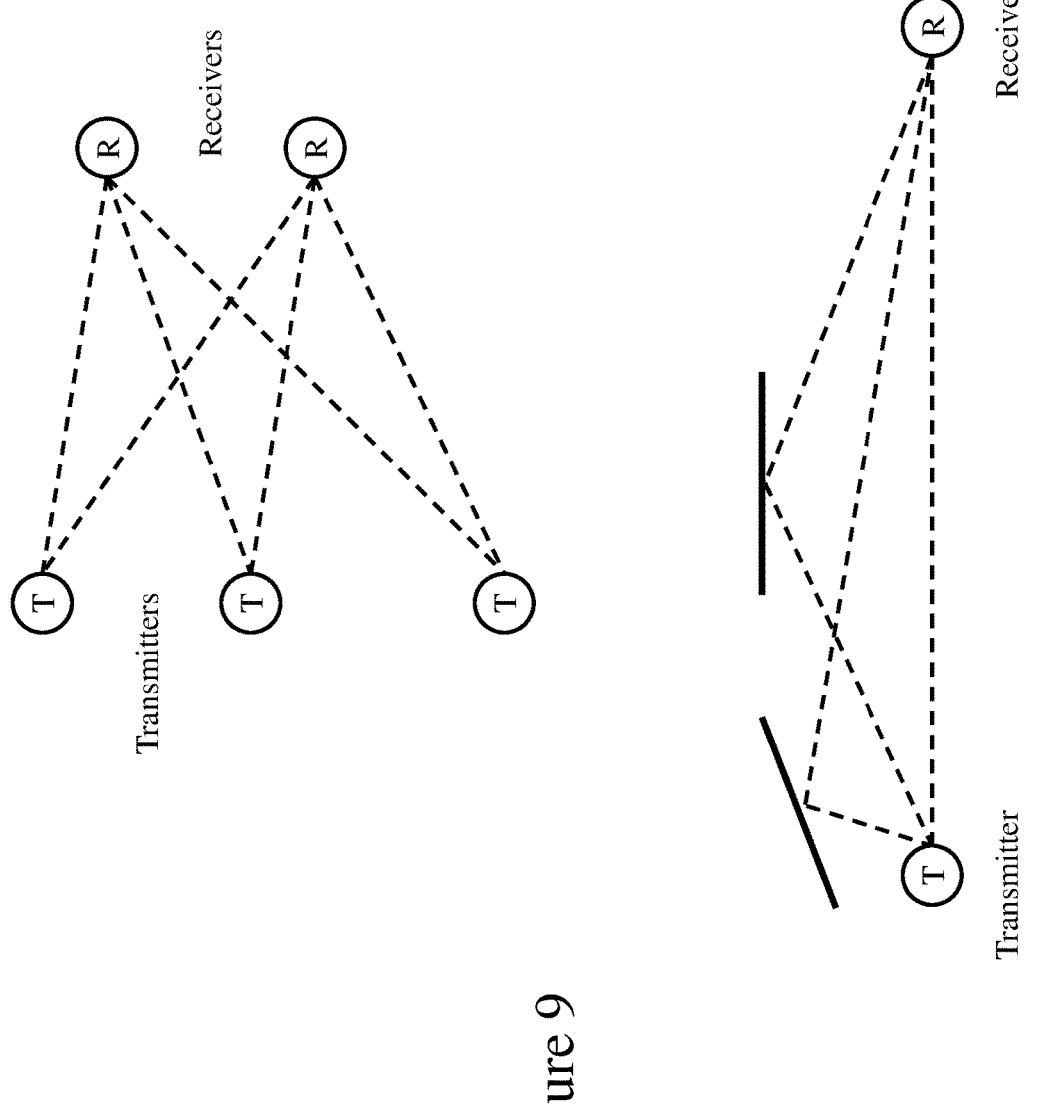
FIG. 9 depicts an extension according to an embodiment of the invention for extending the in-direct-link localization technique via multiple direct links to extend the area covered by the localization system.
FIG. 10 depicts how a method and system according to an embodiment of the invention are employed performing multipath decomposition in order to treat each independent path as an in-direct-link localization, i.e., using multiple multipath to improve accuracy and/or to extend the area covered by the localization system.

In an indoor environment, using only one pair of transmitters and receivers may not be sufficient to provide accurate localization. Therefore, many pairs of transmitters and receivers could be used to improve the accuracy. For example, FIG. 9 shows three transmitters and two receivers, i.e., 6 direct links in total. Therefore, using the in-direct-link localization technique described before, we can accurately localize a subject in many different locations.

FIG. 10 depicts the idea of using multipath decomposition for every two wireless nodes exchanging wireless signals in order to extend the in-direct-link localization technique proposed herein for each different path the travelling wireless waves follow. If we can accurately decompose multipaths of the wireless channel, e.g., three paths in FIG. 10, we can use each multipath as a direct path and apply the in-direct-link localization technique. Therefore, in this example, a single pair of transmitters and receivers is able to cover a larger area.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

The invention claimed is:

1. A method for localizing a subject comprising:
   conditioning received wireless signals with a microprocessor;

dynamically calibrating the conditioned received wireless signals with the microprocessor; and establishing a location of a subject in dependence upon a localization process employing wireless channel measurements extracted from the calibrated conditioned received wireless signals;

the dynamic calibration comprises:

applying a signal conditioning process to acquired wireless signals from the plurality of wireless nodes which takes wireless channel measurements of the acquired wireless signals as inputs and applies at least one of filtering and normalization to the wireless channel measurements; and applying an auto-calibration process to the conditioned acquired wireless signals which employs direct-link constraints between the first transmitter and the receiver in conjunction with the conditioned received wireless signals.

2. The method according to claim 1, wherein the received wireless signals are established independent of any wireless transmitter associated with the subject and of any wireless receiver associated with the subject.

3. The method according to claim 1, wherein the dynamic calibration and localization process operate independent of any reference to a wireless fingerprint of the environment within which the receiver and transmitter are operating and localization of the subject is sought.

4. A method for localizing a subject comprising:

establishing a location of a subject in dependence upon a localization process executed upon a microprocessor which employs wireless channel measurements extracted from wireless signals; wherein the wireless signals are acquired by the microprocessor from a plurality of wireless nodes exchanging wireless signals forming part of an environment defining a region within which the subject is localized;

the wireless signals from which the wireless channel measurements are extracted are received wireless signals acquired by the plurality of wireless nodes which are processed by:

applying a signal conditioning process to the received wireless signals; and applying an auto-calibration process to the conditioned received wireless signals;

the localization process employs multipath decompositions for every pair of wireless nodes within the plurality of nodes exchanging wireless signals within the environment; and the localization process employs the multipath decompositions for every wireless path between a wireless node of each pair of wireless nodes and an other wireless node of that pair of wireless nodes.

5. The method according to claim 4, wherein a portion of the plurality of wireless nodes exchange wireless signals according to a first predetermined wireless standard; and another portion of the plurality of wireless nodes exchange wireless signals according to a second predetermined wireless standard.

6. The method according to claim 4, wherein a portion of the plurality of wireless nodes exchange wireless signals according to one or more wireless protocols associated with a region of the wireless spectrum which is at least one of a licensed and regulated for the environment;

another portion of the plurality of wireless nodes exchange wireless signals according to one or more other wireless protocols associated with another region of the wireless spectrum which is unlicensed for the environment.

7. The method according to claim 4, wherein the acquired wireless signals are established independent of any wireless transmitter associated with the subject and of any wireless receiver associated with the subject.

8. The method according to claim 4, wherein the subject is not directly associated with any device comprising at least one of a wireless transmitter originally transmitting the acquired wireless signals and a wireless receiver generating the acquired wireless signals.

9. A method for localizing a subject comprising:

conditioning received wireless signals with a microprocessor;

dynamically calibrating the conditioned received wireless signals with the microprocessor; and establishing a location of a subject in dependence upon a localization process employing wireless channel measurements extracted from the calibrated conditioned received wireless signals; wherein the dynamic calibration comprises an auto-calibration process;

the auto-calibration process employs a set of direct-link constraints and a set of offset settings where each offset setting of the set of offset settings comprises a vector of offsets to generate a series of violation scores for the channel measurements acquired by a receiver of a wireless node of the plurality of wireless nodes and employs the offset setting of the set of offset settings with the lowest violation score to estimate an angle of arrive of the wireless signals acquired;

each direct-link constraint of the set of direct link constraints is a physical constraint of a direct wireless link between a transmitter of a wireless node of the plurality of wireless nodes and a receiver of another wireless node of the plurality of wireless nodes; and each element in the vector of offsets within an offset setting represents a phase offset of an antenna of a plurality of antennas forming part of a receiver of a wireless node of the plurality of wireless nodes.

10. A method for localizing a subject comprising:

conditioning received wireless signals with a microprocessor;

dynamically calibrating the conditioned received wireless signals with the microprocessor; and establishing a location of a subject in dependence upon a localization process employing wireless channel measurements extracted from the calibrated conditioned received wireless signals; wherein the dynamic calibration comprises:

applying a signal conditioning process to acquired wireless signals from the plurality of wireless nodes which takes wireless channel measurements of the acquired wireless signals as inputs and applies at least one of filtering and normalization to the wireless channel measurements; and applying an auto-calibration process to the conditioned acquired wireless signals which employs direct-link constraints between the first transmitter and the receiver in conjunction with the conditioned received wireless signals, the auto-calibration process employs a set of direct-link constraints and a set of offset settings where each offset setting of the set of offset settings comprises a vector of offsets to generate a series of violation scores for the channel measurements acquired by a receiver of a wireless node of the plurality of wireless nodes and employs the offset setting of the set of offset settings 5 with the lowest violation score to estimate an angle of arrive of the wireless signals acquired;

each direct-link constraint of the set of direct link constraints is a physical constraint of a direct wireless link between a transmitter of a wireless node of the plurality 10 of wireless nodes and a receiver of another wireless node of the plurality of wireless nodes; and each element in the vector of offsets within an offset setting represents a phase offset of an antenna of a plurality of antennas forming part of a receiver of a 15 wireless node of the plurality of wireless nodes.

* * * * *